(12) United States Patent
Hong

(10) Patent No.: US 9,015,532 B2
(45) Date of Patent: Apr. 21, 2015

(54) SYSTEM AND METHOD TO TEST EXECUTABLE INSTRUCTIONS

(75) Inventor: Lei Hong, Shanghai (CN)

(73) Assignee: eBay Inc., San Jose, CA (US)

( * ) Notice: Subject to any disclaimer, the term of this patent is extended or adjusted under 35 U.S.C. 154(b) by 804 days.

(21) Appl. No.: 13/126,719

(22) PCT Filed: Oct. 31, 2008

(86) PCT No.: PCT/CN2008/001827
§ 371 (c)(1),
(2), (4) Date: Jun. 20, 2011

(87) PCT Pub. No.: WO2010/048746
PCT Pub. Date: May 6, 2010

(65) Prior Publication Data
US 2011/0264961 A1    Oct. 27, 2011

(51) Int. Cl.
*G06F 11/00* (2006.01)
*H04L 12/26* (2006.01)

(52) U.S. Cl.
CPC ............ *H04L 12/2697* (2013.01); *H04L 43/50* (2013.01)

(58) Field of Classification Search
USPC .................................................. 714/38.1, 28
See application file for complete search history.

(56) References Cited

U.S. PATENT DOCUMENTS

| | | | |
|---|---|---|---|
| 6,192,108 B1 * | 2/2001 | Mumford et al. ................. | 379/9 |
| 6,907,546 B1 | 6/2005 | Haswell et al. | |
| 6,941,261 B1 | 9/2005 | Quinn | |
| 7,000,219 B2 | 2/2006 | Barrett et al. | |
| 7,016,800 B1 * | 3/2006 | Nguyen ......................... | 702/108 |
| 7,185,235 B2 * | 2/2007 | Radestock .................... | 714/47.1 |
| 7,363,355 B2 * | 4/2008 | Knauerhase et al. .......... | 709/219 |
| 7,437,714 B1 * | 10/2008 | Hahn et al. ..................... | 717/124 |
| 7,945,958 B2 * | 5/2011 | Amarasinghe et al. ......... | 726/25 |
| 7,996,818 B1 * | 8/2011 | Venugopal ..................... | 717/124 |
| 8,145,726 B1 * | 3/2012 | Roche et al. .................. | 709/219 |
| 8,504,543 B1 * | 8/2013 | Andreessen et al. .......... | 707/705 |
| 2001/0052111 A1 | 12/2001 | Scott | |
| 2002/0087661 A1 * | 7/2002 | Matichuk et al. ............. | 709/218 |
| 2002/0143819 A1 * | 10/2002 | Han et al. ....................... | 707/513 |

(Continued)

FOREIGN PATENT DOCUMENTS

| | | |
|---|---|---|
| CN | 1716264 A | 1/2006 |
| CN | 1828617 A | 9/2006 |

(Continued)

OTHER PUBLICATIONS

"EBay Developer's Program—Development Tools", http://developer.ebay.com/support/tools/, (2007).

(Continued)

*Primary Examiner* — Loan L. T. Truong
(74) *Attorney, Agent, or Firm* — Schwegman Lundberg & Woessner, P.A.

(57) ABSTRACT

This document discusses, among other things, a method of testing an Application Programming Interface (API) call that includes receiving data identifying a schema associated with web services together with an API call. Various example embodiments may relate to accessing a data repository associated with the schema to identify an API response corresponding to the API call. In some example embodiments, a message is returned that is based on a determination of whether the API call is valid. The example message may simulate an API response from web services.

27 Claims, 8 Drawing Sheets

(56) References Cited

U.S. PATENT DOCUMENTS

| | | | |
|---|---|---|---|
| 2004/0167749 A1* | 8/2004 | Friedman et al. | 702/186 |
| 2005/0075856 A1 | 4/2005 | Wozniak et al. | |
| 2005/0081218 A1* | 4/2005 | Acott et al. | 719/328 |
| 2005/0154900 A1* | 7/2005 | Muttik | 713/188 |
| 2005/0160433 A1* | 7/2005 | Lambert et al. | 719/328 |
| 2005/0193291 A1 | 9/2005 | Subramanian et al. | |
| 2005/0251766 A1* | 11/2005 | Shah et al. | 716/4 |
| 2006/0015314 A1* | 1/2006 | Roesner et al. | 703/22 |
| 2006/0041416 A1* | 2/2006 | Shah et al. | 703/14 |
| 2006/0101358 A1* | 5/2006 | Shah et al. | 716/4 |
| 2006/0190923 A1* | 8/2006 | Jubran | 717/104 |
| 2007/0038890 A1 | 2/2007 | El Far et al. | |
| 2007/0078950 A1* | 4/2007 | Hopkins et al. | 709/217 |
| 2007/0118350 A1* | 5/2007 | van der Made | 703/22 |
| 2007/0168957 A1 | 7/2007 | Li et al. | |
| 2007/0198987 A1* | 8/2007 | Bottger et al. | 719/312 |
| 2007/0283327 A1* | 12/2007 | Mathew et al. | 717/124 |
| 2007/0294586 A1* | 12/2007 | Parvathy et al. | 714/38 |
| 2008/0168092 A1* | 7/2008 | Boggs et al. | 707/104.1 |
| 2008/0178159 A1* | 7/2008 | Roesner et al. | 717/128 |
| 2008/0235106 A1* | 9/2008 | Reisman | 705/26 |
| 2008/0270103 A1* | 10/2008 | Kaszynski et al. | 703/22 |
| 2008/0282230 A1* | 11/2008 | Belvin et al. | 717/125 |
| 2009/0007144 A1* | 1/2009 | Blue et al. | 719/318 |
| 2009/0037807 A1* | 2/2009 | Kuznetsov et al. | 715/234 |
| 2009/0234953 A1* | 9/2009 | Braslavsky | 709/227 |
| 2009/0235282 A1* | 9/2009 | Meijer et al. | 719/320 |
| 2010/0036828 A1* | 2/2010 | Carmel et al. | 707/5 |
| 2010/0077410 A1* | 3/2010 | Graser et al. | 719/330 |
| 2013/0275945 A1* | 10/2013 | Kollberg et al. | 717/124 |

FOREIGN PATENT DOCUMENTS

| | | |
|---|---|---|
| CN | 1848774 | 10/2006 |
| CN | 101261600 | 9/2008 |
| CN | 102204167 A | 9/2011 |
| GB | 2385952 | 9/2003 |
| WO | WO 2010048746 A1 * | 5/2010 |
| WO | WO-2010048746 A1 | 5/2010 |

OTHER PUBLICATIONS

"International Application Serial No. PCT/CN2008/001827, Search Report mailed Apr. 30, 2009", 13 pages.

"International Application Serial No. PCT/CN2008/001827, Written Opinion mailed Apr. 30, 2009", 6 pages.

"Chinese Application Serial No. 200880131338.7, Office Action mailed Jul. 3, 2013", with English translation of claims, 25 pgs.

"Chinese Application Serial No. 200880131838.7, Office Action mailed Mar. 17, 2014", 13 pgs.

"Chinese Application Serial No. 200880131338.7, Response filed Nov. 15, 2013 to Office Action mailed Jul. 3, 2013", with English translation of claims, 11 pgs.

"International Application Serial No. PCT/CN2008001827, International Preliminary Report on Patentability mailed May 12, 2011", 8 pgs.

* cited by examiner

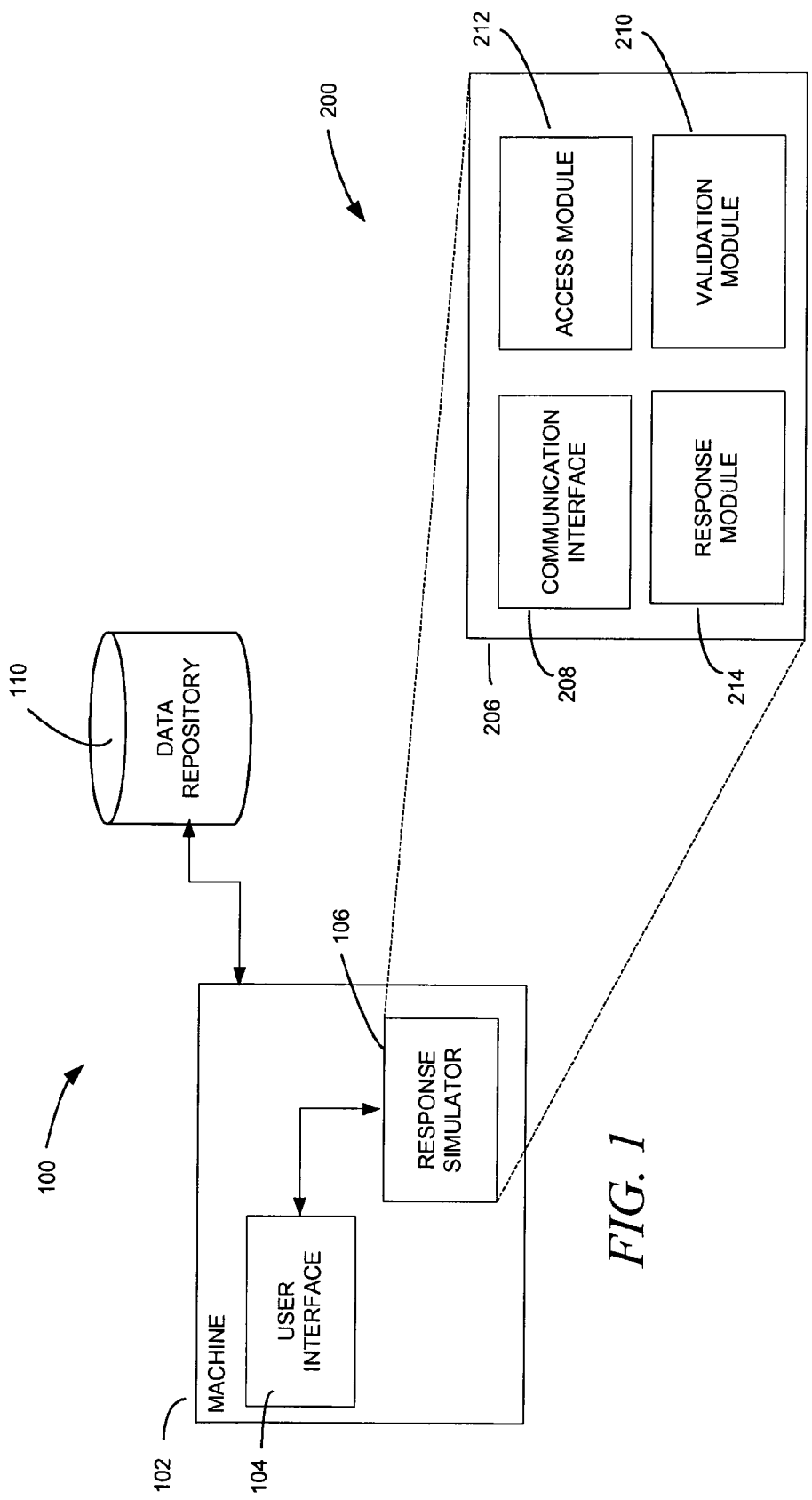

SYSTEM AND METHOD TO TEST EXECUTABLE INSTRUCTIONS

RELATED APPLICATIONS

This application is a U.S. National Stage Filing Under 35 U.S.C. 371 from International Patent Application Serial No. PCT/CN2008/001827, filed on Oct. 31, 2008 and published on May 6, 2010 as WO 2010/048746 A1, the contents of which are incorporated herein by reference.

TECHNICAL FIELD

This patent document pertains generally to software testing, and more particularly, but not by way of limitation, to systems and methods for testing executable instructions.

BACKGROUND

Software developers often test code in a testing environment in order to identify potential flaws and to determine whether the code is likely to be operational in a production environment.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 is a block diagram showing an example machine to test executable instructions, in accordance with an example embodiment;

FIG. 2 is a block diagram showing a response simulator that is an enlarged view of the response simulator, in accordance with an example embodiment;

DETAILED DESCRIPTION

Overview

Figure 3:
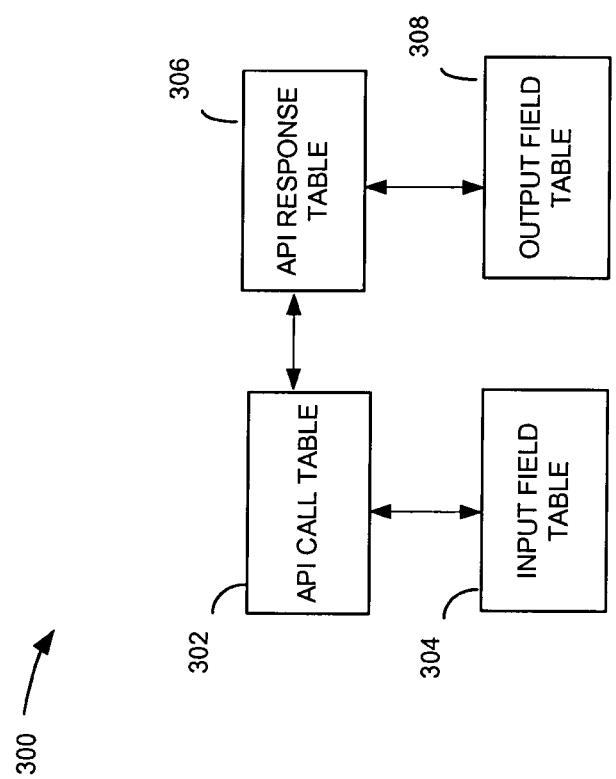
FIG. 3 is a high-level entity relationship diagram, illustrating various tables that may be maintained within a data repository, in accordance with an example embodiment.

Various example embodiments include a response simulator to test executable instructions such as an Application Programming Interface (API) call. The example response simulator may receive data identifying a schema that is associated with web services together with an API call. To determine whether the API call is valid, the response simulator may access a data repository that is associated with the schema to identify an API response corresponding to the API call. Further criteria for determining validity may be employed in some example embodiments. Responsive to the API call and based on determining whether the API call is valid, the response simulator may return a particular message (e.g. an API response). Such a response may simulate a substantially similar API response as would be generated by web services, had web services received and processed the API call. It may be noted that API calls may be submitted via a software user interface such as a desktop program or a web browser. In some example embodiments, the response simulator and web services may simultaneously facilitate testing of API calls via the example user interface described herein.

For various example embodiments, loads on networked server and/or database resources may be significantly reduced for a set of API call tests in comparison to loads sustained by network resources for the same set of API call tests, in the absence of the response simulator. Use of an example response simulator for testing, rather than a dedicated network resources may result in the use of fewer hardware and/or software components and thus, use of the response simulator may aid in avoiding testing down-time.

This overview is intended to provide an overview of the subject matter of the present patent application. It is not intended to provide an exclusive or exhaustive explanation of what is claimed. The detailed description is included to provide further information about the subject matter of the present patent application.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the claimed subject matter. The embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Example Embodiments

FIG. 1 is a block diagram 100 showing an example machine 102 to facilitate testing of executable instructions, in accordance with an example embodiment. FIG. 1 is shown to include the machine 102 communicatively coupled with a data repository 110.

The machine 102 may include any machine that uses a processor to execute instructions. In an example embodiment the machine 102 includes a virtual machine (not shown) to execute one or more sets of instructions. In a virtual environment (e.g., including a virtual machine, virtual interface or other virtual device), a single physical device may appear to other hardware and software as multiple logical devices (e.g., multiple virtual devices). The machine 102 is further shown to include a user interface 104, and a response simulator 106.

Although not shown, the example machine 102 may include one or more hardware user interfaces (e.g., a keyboard, mouse, other input device) to allow a user to input information to be processed by the machine 102. In some example embodiments, the one or more hardware user interfaces (e.g., a display, speakers or other output device) may present information to a user (e.g., by displaying output information such as user directions, user options or any other information that may be presented to a user). In various example embodiments, the one or more hardware user interfaces display a software user interface such as a desktop program interface to allow the input of information associated with testing a set of instructions (e.g. an API call) and to provide the display of information associated with testing the set of executable instructions. Executable instructions relate to operations of a processor inside a machine. Example executable instructions executable instructions may be included within source code, machine language, APIs, commands, messages or other instructions that may be executed by an application, program and/or processor.

Some example embodiments may include displaying a software user interface including a browser program interface to allow the functionality described above with respect to the desktop user interface. An example desktop user interface and an example browser program interface to receive and display testing information are to be discussed in more detail below.

The example response simulator 106 is to test the validity of executable instructions. In various example embodiments, the response simulator 106 may test an API call and generate a message or response to be transferred to the submitter of the API call. The example message may simulate an API response that would be generated by web services based on the API call. Web services may include a software system designed to support interoperable machine-to-machine interaction over a network. Example web services may include a web API accessible over a network and executed on a remote system hosting the requested services.

FIG. 2 is a block diagram 200 showing a response simulator 206 that is an enlarged view of the response simulator 106, in accordance with an example embodiment. The response simulator 206 is shown to include a communication interface 208, a validation module 210, an access module 212 and a response module 214.

The example communication interface 208 is to receive information. (e.g., identifying a particular schema and/or API call) from the user interface 104 and to transfer the information to the access module 212. A schema may include a set of rules to which a document conforms in order to be considered valid according to that schema. An example schema includes an extensible markup language (XML) schema under which a document is constrained in structure and content. The example communication interface 208 may further receive information (e.g., information indicating success, error or partial success of an API call) from the response module 214 and transmit the information to the user interface 104 of FIG. 1.

The access module 212 is to access the data repository 110 of FIG. 1 to reference data as part of an instruction validation process. The example data repository 110 may be located within the machine 102 of FIG. 1 or outside of the machine 102 without departing from the claimed subject matter. The data that is referenced in the data repository 110 may include a schema. In various example embodiments, the schema may define specific API calls and corresponding API responses. For some example schemas, the data repository 110 may include tables arranged to associate an API call and its particular input field(s) to a corresponding API response and its particular output fields. The data repository 110 may further include sample data (e.g., dummy data) to include within the output field(s) of a simulated response to an API call that may be generated by the response simulator 106 of FIG. 1 (e.g., by the response module 214) during testing of the API call.

The validation module 210 is to determine whether a set of instructions are valid based on the data referenced within the data repository 110. In an example embodiment, the validation module 210 determines whether a received API call is valid based on whether the access module 212 recognizes the syntax of the API call and that the particular data fields and/or data values (e.g., data types, operands or arguments or other input) to the API call are valid, and/or based on any other criteria of validity. Depending on the validation module's determination of validity of the API call, the response module 214 may return an acknowledgement message that indicates the success, failure or partial failure of the API call.

The functionality of each of the communication interface 208, validation module 210, access module 212 and response module 214 may be implemented with software, hardware or a combination of software and hardware. In some example embodiments, the modules 210, 212 and 214 are software instructions stored on a machine readable medium (not shown) and executed with one or more processor (not shown) associated with the machine 102.

FIG. 3 is a high-level entity relationship diagram, illustrating various tables 300 that may be maintained within the data repository 110 of FIG. 1, in accordance with an example embodiment. The example tables may be referenced by the access module 212 of FIG. 2 of the response simulator 106 of FIG. 1 to implement testing of instructions such as an API call defined by a particular schema.

An API call table 302 may contain a record for each API call defined by the schema, and may include valid input fields for each API call as well as a name of an API response corresponding to each API call.

The input field table 304 may include a list of input fields defined for all the API calls in the schema. Each input field may be associated with one or more input sub-fields, the names of which may be entered in to the input field table 304. Some example input fields and/or input sub-fields may be valid with particular data values such as certain strings, Boolean operators, numbers or other data input values.

The API response table 306 may contain a record for each API response corresponding to each API call defined by the schema. In an example embodiment, the API response table may include valid output fields for each API response as well as a name of an API call corresponding to each API response.

The output field table 308 may include a list of output fields defined for all the API responses in the schema. Each output field may be associated with one or more output sub-fields, the names of which may be entered in to the output field table 306. Some example output fields and/or output sub-fields may be valid with particular data values such as certain strings, Boolean operators, numbers is other data output.

Figure 4:
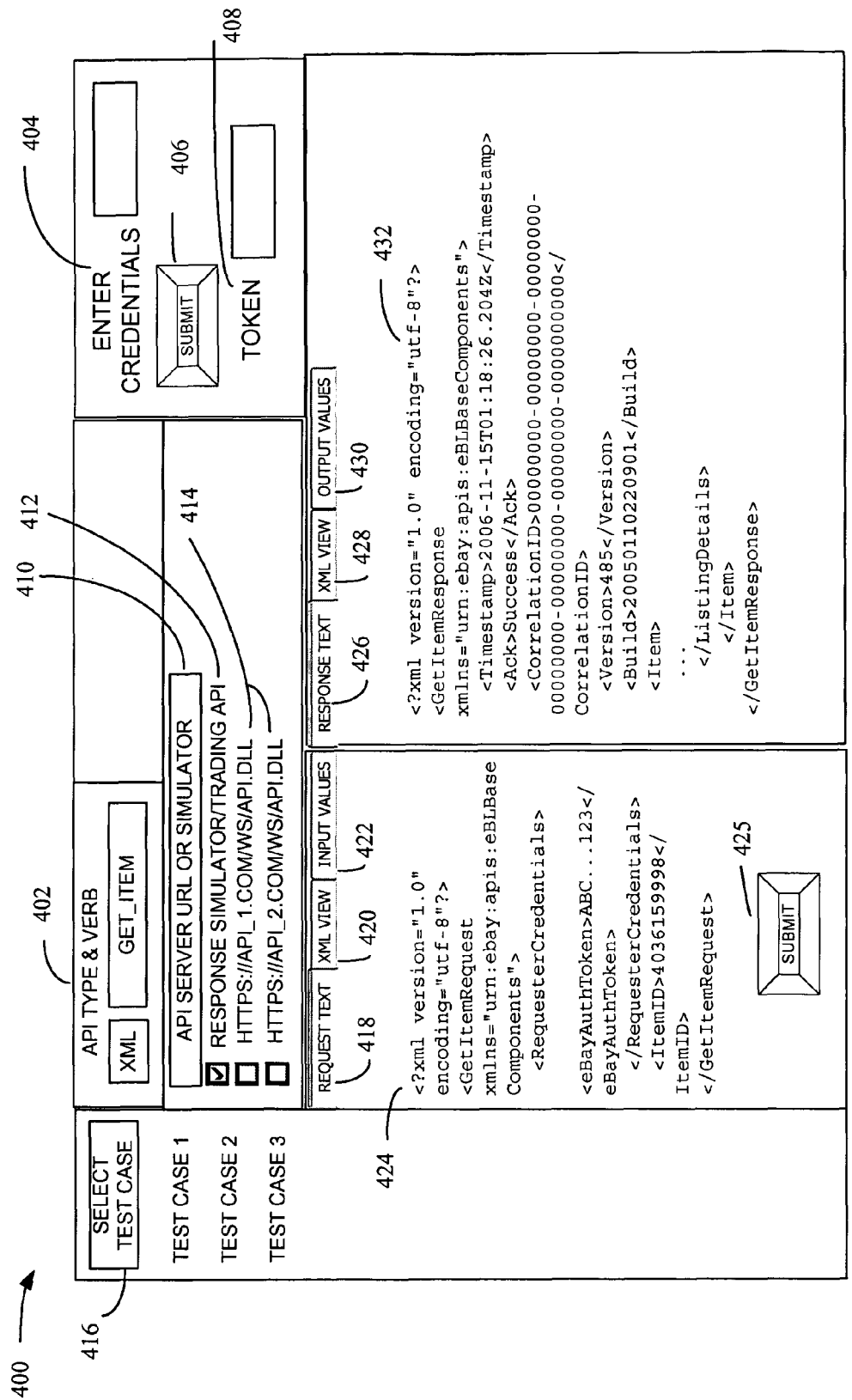
FIG. 4 shows a mockup of a user interface for testing Application Programming Interface (API) calls, in accordance with an example embodiment.

FIG. 4 shows a mockup 400 of a user interface for testing API calls, in accordance with an example embodiment. The mockup 400 may represent an example of the user interface 104 of FIG. 1. The mockup user interface 400 is shown to include multiple frames showing text to display, frames that are selectable to provide functionality and/or include frames with fields to enter information.

It may be noted that the mock interface 400 may be presented to a user as part of a desktop program or a web browser, or other user interface. In an example embodiment, the response simulator 106 a FIG. 1 is integrated into the user interface 104 of FIG. 1 (e.g. a desktop program) through the installation of a plug-in to the desktop program. For some example embodiments, the communication interface 208 of FIG. 2 is to receive an API response from the user interface 104 and the response module is to return a message or an API response to the user interface 104.

The example frame 402 is to allow a user to enter an API type (e.g. the XML API type) and an API command (e.g., the GET_ITEM request). The example frame 404 is to allow a user to enter credentials such as a username and a password that the user may submit by selecting the submit button 406 to receive a token displayed by the frame 408. It may be noted that different forms of credentials may be requested and accompany API calls directed to remote API servers (e.g., to enforce authentication), while such credentials may not be requested or accompany API calls directed to the response simulator 106 of FIG. 1 that is on the machine 102 of FIG. 1.

The example frame 410 may include a label prompting a user to select a response simulator or API server to submit an API call. The example frame 412 is checked indicating that the trading API response simulator is selected to test the API call, while the frames 414 for API_1 and API_2 servers are shown to not be selected. Although one frame 412 to select a response simulator is shown, the user interface may allow for the testing of API calls associated with different schemas. For example, a trading API and a shopping API may each be selected when API when, for example, calls from each type of API are to be submitted for testing in succession. For some example embodiments, the response simulator and web services may simultaneously facilitate testing of API calls by checking the frame 412 that includes the response simulator box and checking one or more of the boxes within the frame 414.

The example frame 416 may include text prompting a user to select a particular test case from a list. A test case may include saved API calls written in any of various programming languages that a user wishes to return to in the future. The example user interface 104 of FIG. 1 may facilitate the saving of test cases in the example frame 416.

The example frame 418 may include a tab under which an API call to be tested is entered. Text 424 is an example API call entered into a field under the request text tab of frame 418. The request text tab of frame 418 may further include a submit button 425 that when selected, initiates the testing of the API call by directing the request to an appropriate response simulator or API server. The example frame 420 is to show include an XML view of the API call (e.g., to be used when the request text envelopes the XML or other protocol in a further programming language or protocol) and the example frame 422 may include a list of input values that may be appropriate for the particular API call being submitted.

The frame 426 may include a tab under which a response to the API call may be displayed. Text 432 shows an example response to the API call. The frame 428 is to display the XML code corresponding to code presented in the frame 426 labeled as response text. The frame 430 may include a tab to display the output values included within the response and/or all the possible output values defined for the particular API response.

Figure 5:
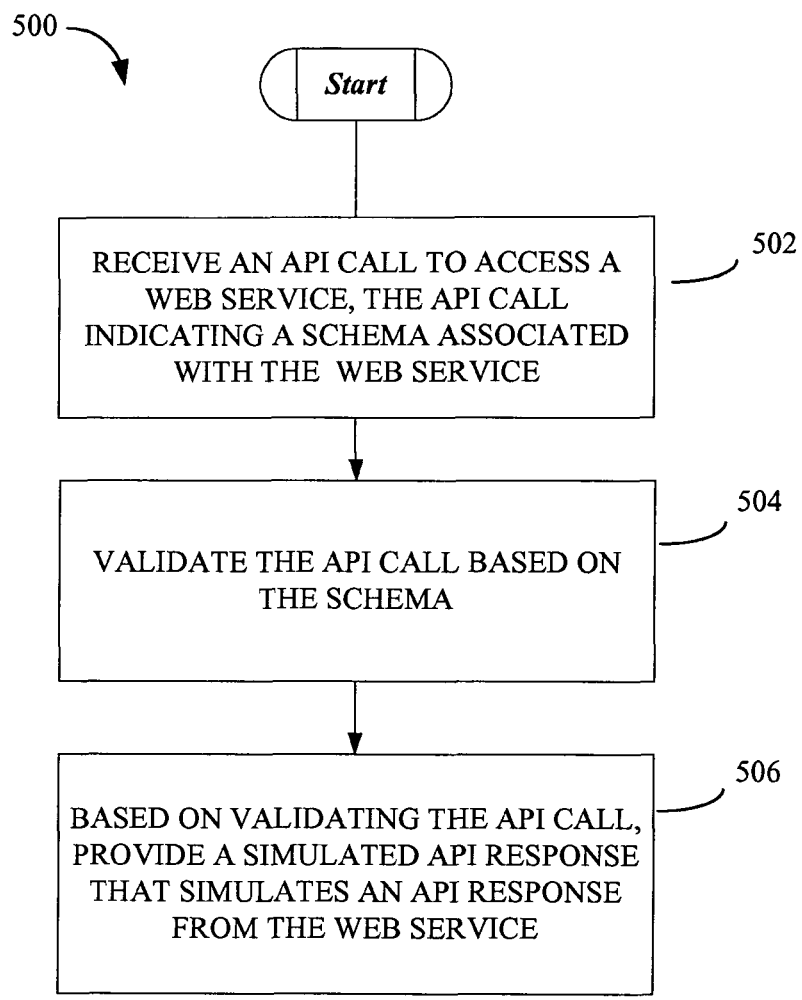
FIG. 5 is a flow diagram illustrating an example method for testing an API call in accordance with an example embodiment.

FIG. 5 is a flow diagram illustrating an example method 500 for testing an API call in accordance with an example embodiment. The example method 500 may be implemented by the various example components in FIG. 2.

At block 502, the example method 500 may include receiving an API call to access one or more web services. For some example embodiments, the API call indicates a schema associated with one or more web services. In an example embodiment, the universal resource name (URN) of the schema is submitted with the API call (e.g., by clicking on the submit button 425 of FIG. 4, described below) via the user interface 104 of FIG. 1. FIG. 4 shows an example API call 419 and the example schema encoded within an XML expression 421. The schema information and API call may be transmitted to the response simulator 106 of FIG. 1, where the data are to be received by the communication module of FIG. 2. In various example embodiments, the API call may include one or more input fields that are populated with input values (e.g., to be processed to produce an output value).

At block 504, the method 500 may include validating the API call based on the schema. As described above, the access module 212 of FIG. 2 may receive the schema information within the API call and access the data repository 110 of FIG. 1 to match an API entry in the data repository to the received API call. For various example embodiments accessing the data repository may include the access module 212 determining or identifying based on the schema, a data repository 110 that is associated with the schema and determining or identifying one ore more databases within the data repository. The one or more databases may include a table or tables that are further associated with the schema.

In an example embodiment, the data repository includes the API call table 302 of FIG. 3 that is associated with the schema and includes data related to each API call entered in the table. The access module 212 may access the API call table after determining whether the example API call table includes an API response corresponding to the received API call, the access module 212 may notify the validation module 210 of the outcome.

In FIG. 2, the validation module 210 may determine validity of the API call based on different criteria. For an example embodiment, the validation module 210 may determine that the API call is valid based on the syntax of the API call and receiving from the access module 212, an indication that the API call corresponds to an API response stored in the table 302 or the table 306 of FIG. 3. Further criteria that the validation module 210 may validate an API call may include determining that the input field of the API call is populated with one or more value; and that the input field of the API call is associated with a valid extensible markup language (XML) schema data type. Invalidity of an API call may be determined based on the API call not being consistent with the syntax of the schema.

In an example embodiment the input field table may include a list of the valid XML schema data types. Referring to FIG. 4, text 423 shows an example input field and an input field value for the example API call text 424. The input field value and shown to be item ID while he input field value is shown to be the numbers 4036159998.

In an example embodiment, the API call may correspond to instructions that are executable by web services to perform a function. In some example embodiments, the performance of the function includes generating values for one or more output fields of the API response based on the values in one or more input fields of the API call.

At block 506, the example method 500 may include providing a simulated API response that simulates an API response from web services. Alternatively or additionally, the example response module 214 of FIG. 2 may generate a message that indicates success of the API call, failure of the API call or partial success of the API call. Based on a successful API call, the message may additionally include one or more output fields that are populated with a value. Such a message may simulate a message that web services may have generated had Web services received API call. In FIG. 4, the text 437 shows an output field in an output field value. The output field in the text 437 is shown to be correlation ID while the output field value is shown to be a string of zeros and the hyphens. The output field correlation ID, as well as other output fields may be stored in the output field table 308 of FIG. 3. The example API response 432 text may be substantially similar to an API response typically generated by web services.

It may be noted that in an environment involving communication between applications using an API, the claimed subject matter may be used to mock the behavior of an application by returning an API response to an application that sends an API call. The example response simulator 106 may record XML responses corresponding to test API calls making the XML responses readily available to be used for future testing without a need to recalculate XML responses for every test API call. In some example embodiments, responses to frequently used API calls may be organized so as to be accessed efficiently when an API response is to be returned. A user or developer may access the recorded XML responses to incorporate tested API calls (e.g., API calls known to be functional) into a testing sequence, which may reduce an overall time period spent composing a sequence of API calls for testing.

Through practice of example embodiments described above, an API testing process may be conducted by a tester's example machine and may avoid the use of networked server and/or database resources. Alternatively or additionally, testing of some API calls is performed by network resources that are included within a network commerce system and communicatively coupled to a tester's machine, while other API calls may be tested by a response simulator 106 of FIG. 1 on the tester's machine (e.g., the machine 102 of FIG. 1). For various example embodiments, loads on networked server and/or database resources may be significantly reduced for a set of API call tests in comparison to loads sustained by network resources for the same set of API call tests, in the absence of the response simulator.

Use of an example response simulator 106 for testing rather than a dedicated application on a server may aid in avoiding testing downtime. For example a response simulator 106 may include instructions of relatively lower complexity than those of applications servers, which may result in the latter being more likely to become inaccessible due to its complexity and/or any of a variety of other reasons (e.g., developmental testing taking network resources offline, network outages, software corruption, hardware failure, etc.).

Figure 6:
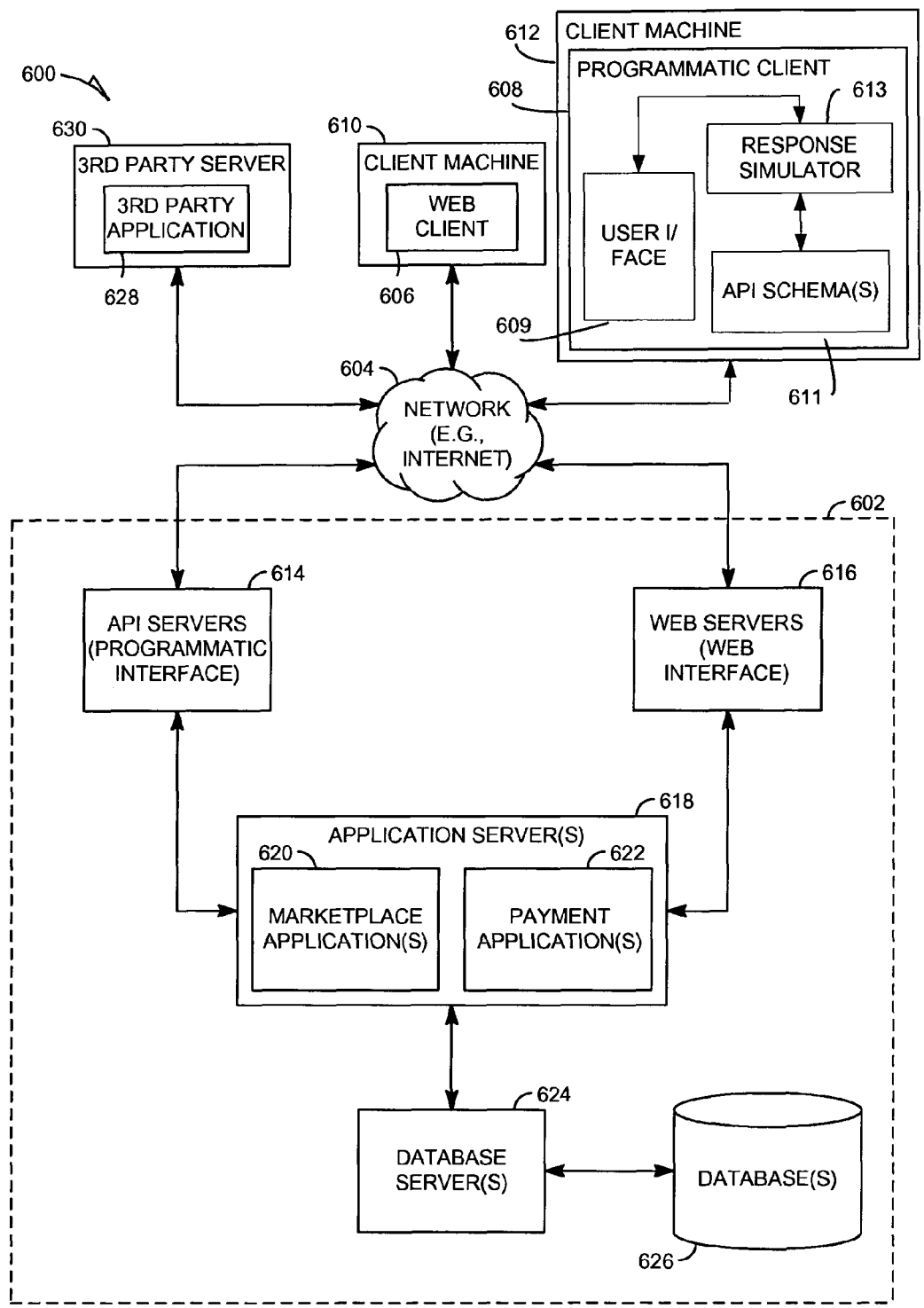
FIG. 6 is a network diagram depicting a client-server system, within which example embodiments may be deployed.

FIG. 6 is a network diagram depicting a client-server system 600, within which example embodiments may be deployed. A networked system 602, in the example forms of a network-based marketplace or publication system, provides server-side functionality, via a network 604 (e.g., the Internet or Wide Area Network (WAN)) to one or more clients. FIG. 6 illustrates, for example, a web client 606 (e.g., a browser, such as the Internet Explorer browser developed by Microsoft Corporation of Redmond, Washington State), and a programmatic client 608 executing on respective client machines 610 and 612.

An Application Program Interface (API) server 614 and a web server 616 are communicatively coupled to, and provide programmatic and web interfaces respectively to, one or more application servers 618. The application servers 618 host one or more marketplace applications 620 and payment applications 622. The application servers 618 are, in turn, shown to be coupled to one or more databases servers 624 that facilitate access to one or more databases 626.

The marketplace applications 620 and the payment applications 622 may exist in a production environment, where the applications 620 and 622 provide functions and services associated with actual commercial activity relating to subject matter of value and real users or entities. Alternatively or additionally the marketplace applications 620 and the payment applications 622 may exist in a testing environment (e.g., testing of API calls) associated with fictitious commercial activity relating to fictitious subject matter and fictitious users or entities.

The marketplace applications 620 may provide a number of marketplace functions and services to users that access the networked system 602. The payment applications 622 may likewise provide a number of payment services and functions to users. The payment applications 622 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 620. While the marketplace and payment applications 620 and 622 are shown in FIG. 6 to both form part of the networked system 602, it will be appreciated that, in alternative embodiments, the payment applications 622 may form part of a payment service that is separate and distinct from the networked system 602.

Further, while the system 600 shown in FIG. 6 employs client-server architecture, the present subject matter is, of course, not limited to such an architecture, and could equally well find application in a distributed, or peer-to-peer, architecture system, for example. The various marketplace and payment applications 620 and 622 could also be implemented as standalone software programs, which do not necessarily have networking capabilities.

The programmatic client 608 accesses the various services and functions provided by the marketplace and payment applications 620 and 622 via the programmatic interface provided by the API server 614. The programmatic client 608 may, for example, be a seller application (e.g., the TurboLister application developed by eBay Inc., of San Jose, Calif.) to enable sellers to author and manage listings on the networked system 602 in an off-line manner, and to perform batch-mode communications between the programmatic client 608 and the networked system 602. The programmatic client 608 is shown to include a user interface 609, stored API schema information 611 and a response simulator 613, which may be substantially similar to the user interface 104, response simulator 106 and the data repository 110 described with respect to FIG. 1.

The web client 606 may access the various marketplace and payment applications 620 and 622 via the web interface supported by the web server 616. As described above, the example web client 606 (e.g., a web browser) may be used an interface to submit API calls and related information for the purpose of testing an API call.

FIG. 6 also illustrates a third party application 628, executing on a third party server machine 630, as having programmatic access to the networked system 602 via the programmatic interface provided by the API server 614. For example, the third party application 628 may, utilizing information retrieved from the networked system 602, support one or more features or functions on a website hosted by the third party. The third party website may, for example, provide one or more promotional, marketplace or payment functions that are supported by the relevant applications of the networked system 602.

Figure 7:
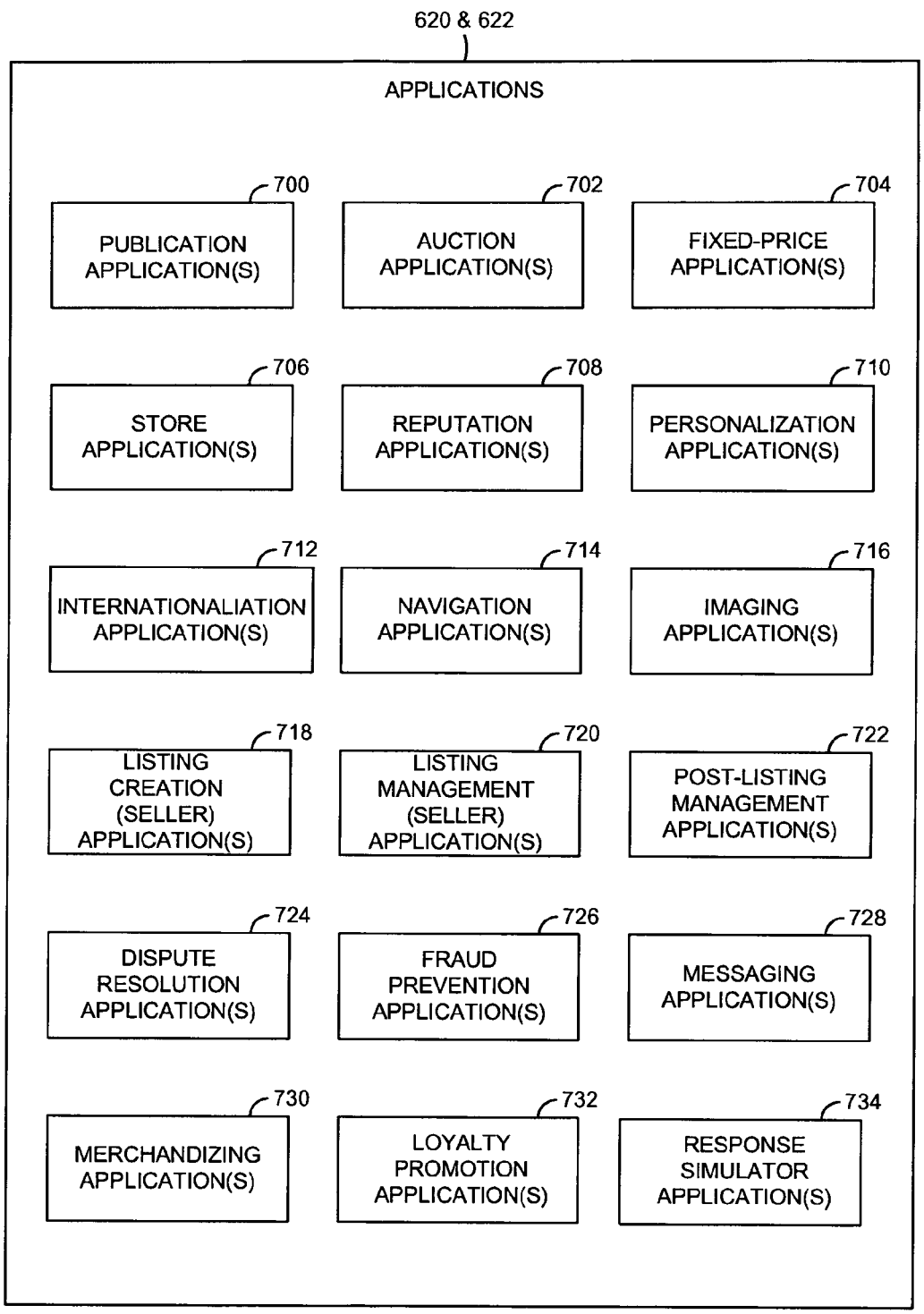
FIG. 7 is a block diagram illustrating multiple applications that, in an example embodiment, are provided as part of a networked system.

FIG. 7 is a block diagram illustrating multiple applications 620 and 622 of FIG. 6 that, in one example embodiment, are provided as part of the networked system 602 of FIG. 6. The applications 620 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access server one or more databases 626 via the database servers 624 of FIG. 6.

In example embodiments, to test API calls, the programmatic client 608 of FIG. 6 may simulate API responses that are generated by one or more of the applications 620 and 622 when API calls are received and processed by the applications 620 and 622. The simulation of API responses may be allowed independent of the applications 620 and 622, via the user interface 609, the API schemas 611 and the response simulator 613 of FIG. 6.

The networked system 602 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 620 are shown to include at least one publication application 700 and one or more auction applications 702 which support auction-format listing and price setting mechanisms (e.g., English, Dutch, Vickrey, Chinese, Double, Reverse auctions etc.). The various auction applications 702 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 704 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 706 allow a seller to group listings within a "virtual" store, which may be branded and otherwise personalized by and for the seller. Such a virtual store may also offer promotions, incentives and features that are specific and personalized to a relevant seller.

Reputation applications 708 allow users that transact, utilizing the networked system 602 of FIG. 6, to establish, build and maintain reputations, which may be made available and published to potential trading partners. Consider that where, for example, the networked system 602 supports person-to-person trading, users may otherwise have no history or other reference information whereby the trustworthiness and credibility of potential trading partners may be assessed. The reputation applications 708 allow a user, for example through feedback provided by other transaction partners, to establish a reputation within the networked system 602 over time. Other potential trading partners may then reference such a reputation for the purposes of assessing credibility and trustworthiness.

Personalization applications 710 allow users of the networked system 602 to personalize various aspects of their interactions with the networked system 602. For example a user may, utilizing an appropriate personalization application 710, create a personalized reference page at which information regarding transactions to which the user is (or has been) a party may be viewed. Further, a personalization application 710 may enable a user to personalize listings and other aspects of their interactions with the networked system 602 and other parties.

The networked system 602 may support a number of marketplaces that are customized, for example, for specific geographic regions. A version of the networked system 602 may be customized for the United Kingdom, whereas another version of the networked system 602 may be customized for the United States. Each of these versions may operate as an independent marketplace, or may be customized (or internationalized) presentations of a common underlying marketplace. The networked system 602 may accordingly include a number of internationalization applications 712 that customize information (and/or the presentation of information) by the networked system 602 according to predetermined criteria (e.g., geographic, demographic or marketplace criteria). For example, the internationalization applications 712 may be used to support the customization of information for a number of regional websites that are operated by the networked system 602 and that are accessible via respective web servers 616 of FIG. 6.

Navigation of the networked system 602 may be facilitated by one or more navigation applications 714. For example, a search application (as an example of a navigation application) may enable key word searches of listings published via the networked system 602. A browse application may allow users to browse various category, catalogue or inventory data structures according to which listings may be classified within the networked system 602. Various other navigation applications may be provided to supplement the search and browsing applications.

In order to make listings, available via the networked system 602, as visually informing and attractive as possible, the marketplace applications 620 may include one or more imaging applications 716 utilizing which users may upload images for inclusion within listings. An imaging application 716 also operates to incorporate images within viewed listings. The imaging applications 716 may also support one or more promotional features, such as image galleries that are presented to potential buyers. For example, sellers may pay an additional fee to have an image included within a gallery of images for promoted items.

Listing creation applications 718 allow sellers conveniently to author listings pertaining to goods or services that they wish to transact via the networked system 602 and listing management applications 720 allow sellers to manage such listings. Specifically, where a particular seller has authored and/or published a large number of listings, the management of such listings may present a challenge. The listing management applications 720 provide a number of features (e.g., auto-relisting, inventory level monitors, etc.) to assist the seller in managing such listings. One or more post-listing management applications 722 may also assist sellers with a number of activities that typically occur post-listing. For example, upon completion of an auction facilitated by one or more auction applications 702, a seller may wish to leave feedback regarding a particular buyer. To this end, a post-listing management application 722 may provide an interface to one or more reputation applications 708, so as to allow the seller conveniently to provide feedback regarding multiple buyers to the reputation applications 708.

Dispute resolution applications 724 provide mechanisms whereby disputes arising between transacting parties may be resolved. For example, the dispute resolution applications 724 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 726 implement fraud detection and prevention mechanisms to reduce the occurrence of fraud within the networked system 602.

Messaging applications 728 are responsible for the generation and delivery of messages to users of the networked system 602, such messages for example advising users regarding the status of listings at the networked system 602 (e.g., providing "outbid" notices to bidders during an auction process or to provide promotional and merchandising information to users). Respective messaging applications 728 may utilize any one have a number of message delivery networks and platforms to deliver messages to users. For example, messaging applications 728 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, Wi-Fi, WiMAX) networks.

Merchandising applications 730 support various merchandising functions that are made available to sellers to enable sellers to increase sales via the networked system 602. The merchandising applications 730 also operate the various merchandising features that may be invoked by sellers, and may monitor and track the success of merchandising strategies employed by sellers.

The networked system 602 itself, or one or more parties that transact via the networked system 602, may operate loyalty programs that are supported by one or more loyalty/promotions applications 732. For example, a buyer may earn loyalty or promotions points for each transaction established and/or concluded with a particular seller, and be offered a reward for which accumulated loyalty points can be redeemed.

Response simulator application(s) 734, in some example embodiments, may be included in the applications 620 and/or 622 to mock or simulate responses from one or more of the other applications 700-732 described above. In such example embodiments, an API call may be submitted via a client machine 610 and/or 612 of FIG. 6 to the response simulator 734 to test API calls typically received and processed by other of the applications 700-732 using application servers 618, database servers 624 and databases 626 of FIG. 6. Employing the response simulator application(s) 734 rather than multiple other applications may result in a conservation of resources because fewer application servers 618, database servers 624 and databases 626 may be used to simulate the API responses.

Figure 8:
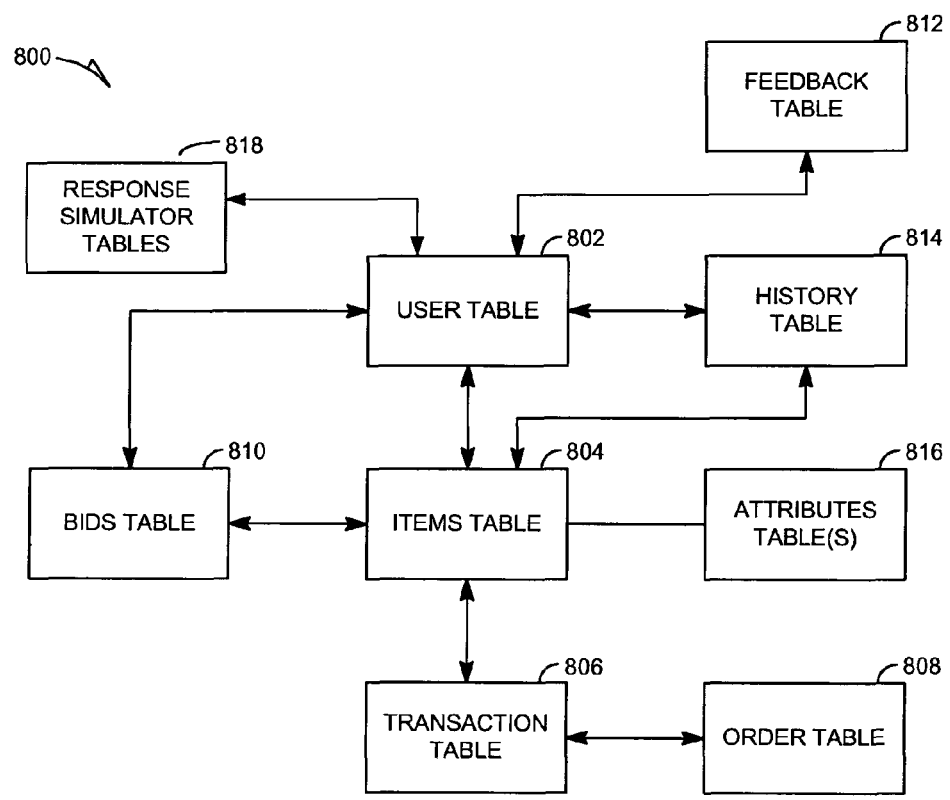
FIG. 8 is a high-level entity-relationship diagram, illustrating various tables that may be maintained within databases, and that are utilized by and support applications.

FIG. 8 is a high-level entity-relationship diagram, illustrating various tables 800 that may be maintained within the databases 626, and that are utilized by and support the applications 620 and 622 of FIG. 6. A user table 802 contains a record for each registered user of the networked system 602 of FIG. 6, and may include identifier, address and financial instrument information pertaining to each such registered user. A user may operate as a seller, a buyer, or both, within the networked system 602. In one example embodiment, a buyer may be a user that has accumulated value (e.g., commercial or proprietary currency), and is accordingly able to exchange the accumulated value for items that are offered for sale by the networked system 602.

The tables 800 also include an items table 804 in which are maintained item records for goods and services that are available to be, or have been, transacted via the networked system 602. Each item record within the items table 804 may furthermore be linked to one or more user records within the user table 802, so as to associate a seller and one or more actual or potential buyers with each item record.

A transaction table 806 contains a record for each transaction (e.g., a purchase or sale transaction) pertaining to items for which records exist within the items table 804.

An order table 808 is populated with order records, each order record being associated with an order. Each order, in turn, may be with respect to one or more transactions for which records exist within the transaction table 806.

Bid records within a bids table 810 each relate to a bid received at the networked system 602 in connection with an auction-format listing supported by an auction application 702 of FIG. 7. A feedback table 812 is utilized by one or more reputation applications 708 of FIG. 7, in one example embodiment, to construct and maintain reputation information concerning users. A history table 814 maintains a history of transactions to which a user has been a party. One or more attributes tables 816 record attribute information pertaining to items for which records exist within the items table 804. Considering only a single example of such an attribute, the attributes tables 816 may indicate a currency attribute associated with a particular item, the currency attribute identifying the currency of a price for the relevant item as specified in by a seller.

Response simulator tables may include API call tables 302, input field tables 304, API response tables 306 and output field tables 308 as described with respect to FIG. 3. The response simulator tables may further include sample data to be entered in to output fields of simulated API responses.

Figure 9:
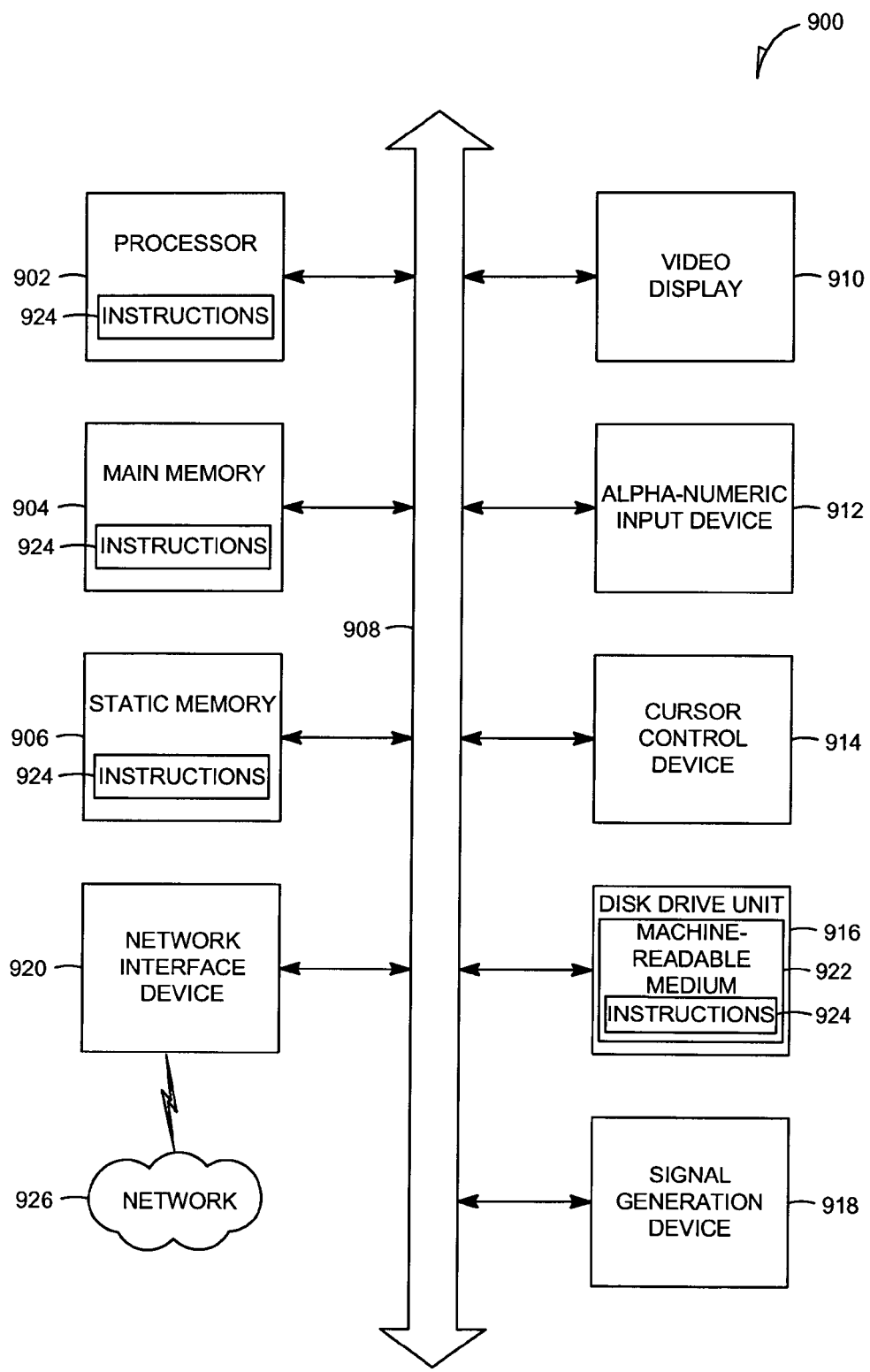
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine in the example form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions 924 (e.g., software) embodying any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present subject matter. The term "machine-readable medium" shall accordingly be taken to include, but not be limited to, solid-state memories, optical and magnetic media and carrier wave signals.

Thus, a method and system to test executable instructions have been described. The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of testing an application programming interface (API) call, comprising:
   receiving a test API call to access at least one web service, the test API call indicating a schema associated with the at least one web service;
   validating the test API call based on the schema;
   simulating an API response for the validated test API call that would be generated by the at least one web service had the at least one web service received and processed the test API call, the simulated API response including sample data; and
   providing the simulated API response.

2. The method of claim 1, wherein the test API call includes at least one input field.

3. The method of claim 2, wherein validating the test API call includes verifying at least one of:
   that the input field is populated with at least one value; or
   that the input field is associated with a valid extensible markup language (XML) schema data type.

4. The method of claim 1, wherein the test API call corresponds to instructions executable by the at least one web service to perform a function.

5. The method of claim 1, wherein the validating of the test API call includes validating the test API call based on syntax of the schema.

6. The method of claim 1, wherein simulating the API response includes generating the simulated API response including at least one output field populated with a value.

7. The method of claim 1, further comprising:
   returning an error message based on invalidating the test API call that is not consistent with syntax of the schema.

8. The method of claim 7, wherein the receiving of the test API call includes receiving the test API call via a world wide web (WWW) from a web browser, and the returning the error message includes returning the simulated API response or the error message to the web browser.

9. The method of claim 7, wherein the receiving of the test API call includes receiving the test API call via a world wide web (WWW) from a desktop interface, and the returning of the error message includes returning the simulated response or the error message to the desktop interface.

10. A non-transitory machine-readable medium storing instructions, which when executed by the least one processor performs a method of testing an application programming interface (API) call, the method comprising:
    receiving a test API call to access at least one web service, the test API call indicating a schema associated with the at least one web service;
    validating the test API call based on the schema;
    simulating an API response for the validated test API call that would be generated by the at least one web service had the at least one web service received and processed the API call, the simulated API response including sample data; and
    providing the simulated API response.

11. The non-transitory machine-readable medium of claim 10, wherein the test API call includes at least one input field.

12. The non-transitory machine-readable medium of claim 11, wherein validating the test API call includes verifying at least one of:
    that the input field is populated with at least one value; or
    that the input field is associated with a valid extensible markup language (XML) schema data type.

13. The non-transitory machine-readable medium of claim 10, wherein the test API call corresponds to instructions executable by the at least one web service to perform a function.

14. The non-transitory machine-readable medium of claim 10, wherein the validating of the API call includes validating the test API call based on syntax of the schema.

15. The non-transitory machine-readable medium of claim 10, wherein simulating the API response includes generating at least one output field populated with a value.

16. The non-transitory machine-readable medium of claim 10, further comprising:
returning an error message based on invalidating the test API call that is not consistent with syntax of the schema.

17. A response simulator to test an Application Programming Interface (API) call, the response simulator comprising:
a communication interface to be communicatively coupled to a user interface and to receive from the user interface:
a test API call to access at least one web service, the test API call indicating a schema associated with the at least one web service;
a validation module communicatively coupled to the communication interface to determine whether the test API call is valid; and
a response module communicatively coupled to the validation module and to the communication interface to:
simulate an API response for the validated test API call that would be generated by the at least one web service had the at least one web service received and processed the test API call, the simulated API response including sample data, and
provide the simulated API response.

18. The response simulator of claim 17, wherein the test API call includes at least one input field populated with a value.

19. The response simulator of claim 18, wherein the validation module is to determine the valid test API call based on verifying at least one of:
that the input field is populated with at least one value; or
that the input field is associated with a valid extensible markup language (XML) schema data type.

20. The response simulator of claim 17, wherein the test API call corresponds to instructions executable by the web services to perform a function.

21. The response simulator of claim 17, wherein the validation module is to validate the test API call based on syntax of the schema.

22. The response simulator of claim 17, wherein the response module is to indicate failure or partial success of the test API call, based on comparing the test API call with syntax of the schema.

23. The response simulator of claim 22, wherein the communication module is to receive the test API call via a world wide web (WWW) from a web browser, and the communication module is to return an indication of failure or partial success of the test API call to the web browser via the WWW.

24. The response simulator of claim 22, wherein the communication module is to receive the test API call via a world wide web (WWW) from a desktop program interface, and the communication module is to return an indication of failure or partial success of the test API call to the desktop program interface via the WWW.

25. The response simulator of claim 17, wherein the response module is to generate the simulated API response that includes at least one output field populated with a value.

26. The response simulator of claim 17, wherein the response simulator is integrated into a desktop program via installation of a plugin to the desktop program, wherein the desktop program is included within the user interface.

27. A system to test an application programming interface (API) call, comprising:
receiving means for receiving a test API call to access at least one web service, the test API call indicating a schema associated with the at least one web service;
validating means for validating the test API call based on the schema;
simulating means for simulating an API response for the validated test API call that would be generated by the at least one web service had the at least one web service received and processed the test API call; and
responsive means for providing the simulated API response.

* * * * *